US012628747B2

(12) United States Patent
Bartnik Johansson et al.

(10) Patent No.: US 12,628,747 B2
(45) Date of Patent: May 19, 2026

(54) METHOD FOR PRODUCING OXIDIZED LIGNINS AND SYSTEM FOR PRODUCING OXIDIZED LIGNINS

(71) Applicant: ROCKWOOL A/S, Hedehusene (DK)

(72) Inventors: Dorte Bartnik Johansson, Roskilde (DK); Jens-Uwe Wichmann, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 799 days.

(21) Appl. No.: 17/995,110

(22) PCT Filed: Apr. 3, 2020

(86) PCT No.: PCT/EP2020/059651
§ 371 (c)(1),
(2) Date: Sep. 29, 2022

(87) PCT Pub. No.: WO2021/197629
PCT Pub. Date: Oct. 7, 2021

(65) Prior Publication Data
US 2023/0174566 A1     Jun. 8, 2023

(51) Int. Cl.
| | |
|---|---|
| *A01G 24/18* | (2018.01) |
| *B01J 19/24* | (2006.01) |
| *C03C 13/06* | (2006.01) |
| *C03C 25/32* | (2018.01) |
| *C03C 25/34* | (2006.01) |
| *C03C 25/47* | (2018.01) |
| *C07G 1/00* | (2011.01) |
| *C08H 7/00* | (2011.01) |
| *C08L 97/00* | (2006.01) |

(52) U.S. Cl.
CPC .......... *A01G 24/18* (2018.02); *B01J 19/2415* (2013.01); *C03C 13/06* (2013.01); *C03C 25/32* (2013.01); *C03C 25/34* (2013.01); *C03C 25/47* (2018.01); *C07G 1/00* (2013.01); *C08H 6/00* (2013.01); *C08L 97/005* (2013.01); *B01J 2219/24* (2013.01); *C08L 2201/54* (2013.01)

(58) Field of Classification Search
CPC ...................................................... C07G 1/00
See application file for complete search history.

(56) References Cited

U.S. PATENT DOCUMENTS

| | | | | |
|---|---|---|---|---|
| 3,093,604 | A * | 6/1963 | Ayers | C08L 61/00 |
| | | | | 156/335 |
| 6,238,475 | B1 | 5/2001 | Gargulac et al. | |
| 2003/0042344 | A1 | 3/2003 | Fisch et al. | |
| 2010/0069662 | A1 | 3/2010 | Gropp et al. | |
| 2010/0159521 | A1 * | 6/2010 | Cirakovic | C12P 7/10 |
| | | | | 536/128 |
| 2021/0371443 | A1 * | 12/2021 | Johansson | C07G 1/00 |

(Continued)

FOREIGN PATENT DOCUMENTS

| | | | | |
|---|---|---|---|---|
| CA | 2164394 | A1 * | 6/1996 | .......... D21C 9/1036 |
| WO | 2020070341 | A1 | 4/2020 | |

OTHER PUBLICATIONS

Capanema et al. (Holzforschung 56 (2002) 402-415) (Year: 2002).*

(Continued)

*Primary Examiner* — Liam J Heincer
(74) *Attorney, Agent, or Firm* — Abel Schillinger, LLP

(57) ABSTRACT

The invention relates to a method for producing oxidized lignins.

20 Claims, 6 Drawing Sheets

(56) References Cited

U.S. PATENT DOCUMENTS

2021/0371444  A1*  12/2021  Johansson ................ C07G 1/00
2022/0119722  A1*   4/2022  Deiana .................... C07C 41/01
2023/0151042  A1*   5/2023  Bartnik Johansson .. C07G 1/00
                                                           530/500

OTHER PUBLICATIONS

Aro et al. (ChemSusChem 2017, 10, 1861-1877) (Year: 2017).*
More et al., "A review of lignin peroxide oxidation chemistry with
emphasis of aromatic aldehyde and acids", De Gruyter, Holzforschung
Mar. 17, 2021, pp. 1-18.
Rahimi et al., "Chemoselective Metal-Free Aerobic Alcohol Oxi-
dation in Lignin", J. Am. Chem. Soc. 2013, 135, pp. 6415-6418.
Ghorbani et al., "Ammoxidized Fenton-Activated Pine Kraft Lignin
Accelerates Synthesis and Curing of Resole Resins", Polymers,
(Jan. 28, 2017), vol. 9, No. 12, doi:10.3390/polym9020043, p. 43.
Meier et al., "Conversion of technical lignins into slow-release
nitrogenous fertilizers by ammoxidation in liquid phase", Bioresource
Technology, Amsterdam, NL, (Jan. 1, 1994), vol. 49, No. 2, doi:
10.1016/0960-8524(94) 90075-2, ISSN 0960-8524, pp. 121-128.
U.S. Appl. No. 17/995,105, filed Sep. 29, 2022.

* cited by examiner

Fig. 2

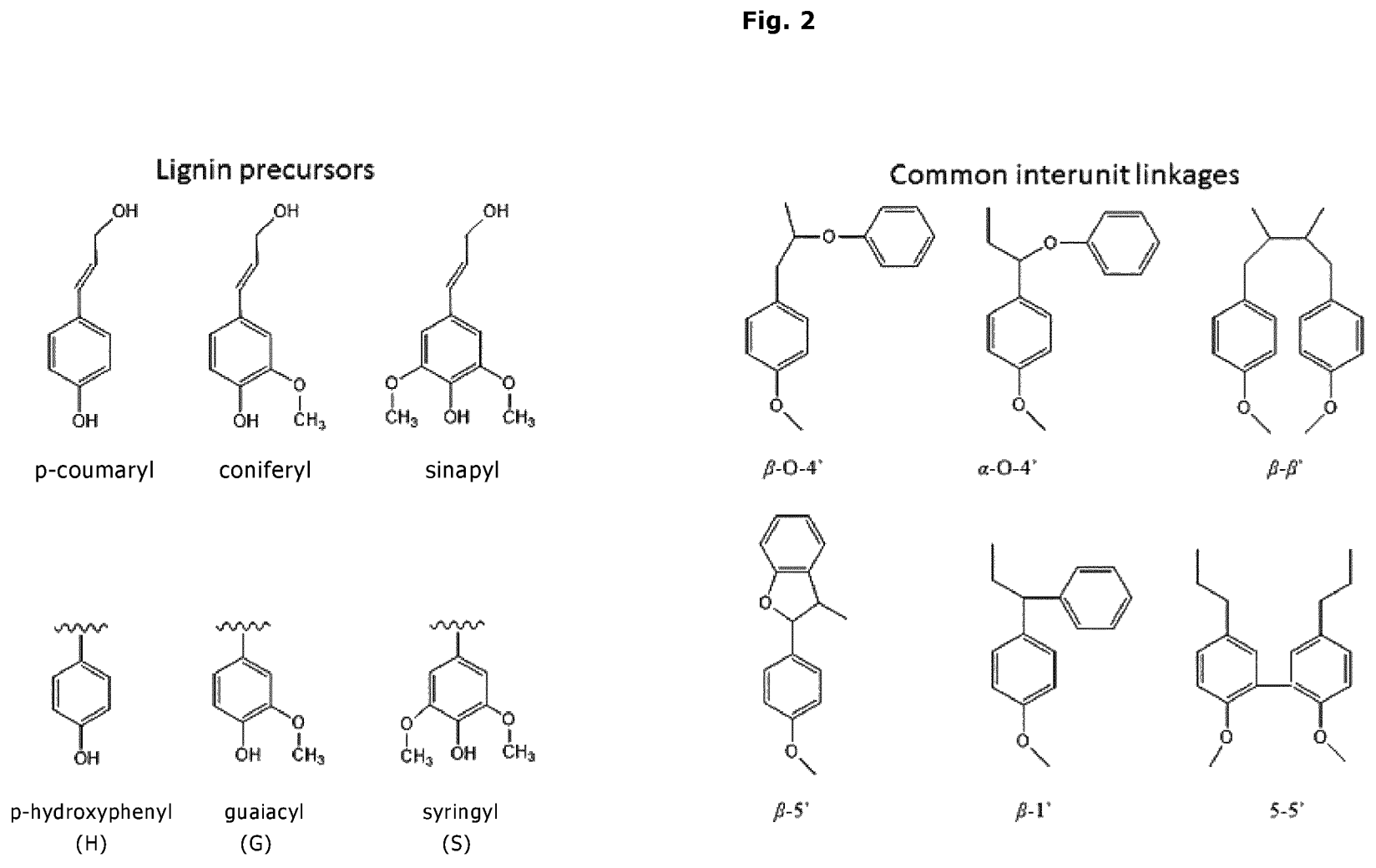

Common interunit linkages

β-β'

5-5'

α-O-4'

β-1'

β-O-4'

β-5'

Lignin precursors sinapyl coniferyl p-coumaryl syringyl (S)

guaiacyl (G)

p-hydroxyphenyl (H)

METHOD FOR PRODUCING OXIDIZED LIGNINS AND SYSTEM FOR PRODUCING OXIDIZED LIGNINS

FIELD OF THE INVENTION

The present invention relates to a method for producing oxidized lignins, an oxidized lignin prepared by such a method and the use of such oxidized lignins as a component in a binder composition, such as an aqueous binder composition for mineral fibers; such as a component in an aqueous adhesive composition for lignocellulosic materials. The present invention also relates to a system for performing the method according to the present invention.

BACKGROUND OF THE INVENTION

Lignin is a class of complex organic polymers found as structural materials in vascular plants. It forms about 20-35% of the dry mass of wood and is therefore, except cellulose, the most abundant polymer found in nature. Lignin is a side product in the process of paper production and therefore vast amounts of lignin are produced in the paper making industry. The lignin separated in the paper making process is usually burnt as fuel. In view of this, lignin is a very inexpensive product, which makes it an attractive starting material.

Figure 1:
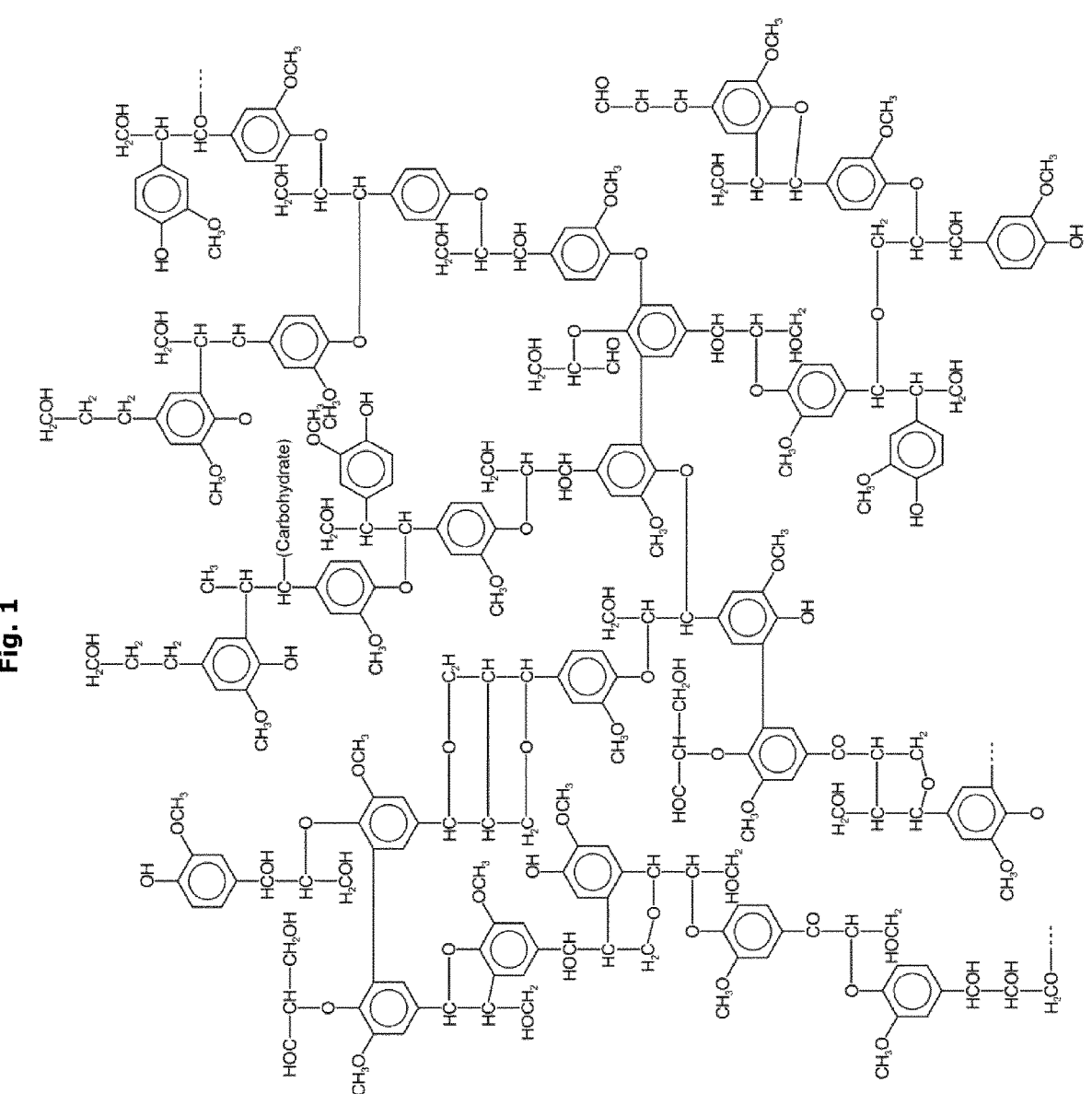

FIG. 1 shows a section from a possible lignin structure.

Accordingly, lignin represents an attractive feedstock due to availability and potentially low price. It is also the main renewable aromatic source. Lignin is composed of three primary units (often called monolignols) linked through ether and C—C bonds (FIG. 2). Representation of these three monolignols depends on the source material although guaiacyl (G) is the most abundant in softwood lignin, guaiacyl and syringyl in hardwood lignin while all three are fairly represented in grasses.

One potential use of lignins is the use in binders, such as binders for mineral fibres.

There are several important characteristics of lignin in relation to binders. Lignin is an aromatic polymer with high glass transition temperature ($T_g$). Lignin thermally decomposes over a wide range of temperatures as different oxygen containing moieties possess different stability and reactions that are occurring can be consecutive but also competing due to hindered structure of lignin polymer. Lignin surface chemistry properties (like surface tension components) are similar to the same properties of cured phenol formaldehyde (PF) binders. This situation makes the reasonable assumption that adhesion properties of lignin can be at the similar level as those of long time used PF binders in insulation materials but also in binding wood etc. However, lignin is an inherently heterogeneous material and on top of that, the lignin properties and structures are different based on various techniques being employed in extracting lignin from biomass. The differences come in terms of structure, bonding pattern of lignin aromatic units, molecular weight etc.

The reactive functional group being present in high amounts in a typical lignin is the hydroxyl group, being either phenolic or aliphatic hydroxyl group. The presence of phenolic hydroxyl group also activates the aromatic ring towards reactions with aldehydes. Overall, it can be said that lignin structure limits the choice of cross-linkers to most often environmentally compromised reagents and therefore limits the possibility to use lignin as a starting material in processes, which include chemical reactions.

In order to utilize lignins as starting materials for different uses, chemical derivatizations of lignins have been proposed. One of the proposed ways of derivatizing lignin is oxidation. Oxidation of lignin is usually carried out with strong oxidation agents in the presence of alkali metal hydroxides.

However, one problem associated with the previously known oxidized lignins is that they are less fire resistant when used in products where they are comprised in a binder composition, compared to the underivatized lignins, said underivatized lignins rendering them unsuitable for many applications. A further problem associated with these previously known oxidized lignins is that residual alkali metal hydroxide in the product tends to render the products unstable and makes them susceptible to changing their properties in an aging process.

Further, previously known derivatization processes for lignins often lack high throughput and are therefore not suitable for the production of derivatized lignins in amounts suitable for industrial mass production.

SUMMARY OF THE INVENTION

Accordingly, it was an object of the present invention to provide a process for the derivatization of lignins, which overcomes the disadvantages of previously known derivatization processes of a lignin.

In particular, it was an object of the present invention to provide a process for the derivatization of lignins that result in derivatized lignins having desired reactivity and at the same time are more fire resistant when used in products where they are comprised in a binder composition, compared to underivatized lignins, and further having improved long term stability.

Further, it was an object of the present invention to provide a process for the derivatization of lignins that allows the production of derivatized lignins with high throughput in amounts suitable for them to be used as a material in industrial mass production.

A further object of the present invention was to provide derivatized lignins prepared according to the method.

A further object of the present invention was to provide a use for derivatized lignins prepared according to the method.

A further object of the present invention was to provide a system for preparing derivatized lignins.

In accordance with a first aspect of the present invention, there is provided a method for producing oxidized lignins comprising bringing into contact a component (i) comprising one or more lignins, a component (ii) comprising ammonia and/or one or more amine, components, and/or any salt thereof and/or an alkali and/or earth alkali metal hydroxide, such as sodium hydroxide and/or potassium hydroxide, a component (iii) comprising one or more oxidation agents, and optionally a component (iv) in form of one or more plasticizers, and allowing a mixing/oxidation step, wherein an oxidised mixture is produced, followed by an oxidation step, wherein the oxidised mixture is allowed to continue to react for a dwell time of 1 second to 10 hours, such as 10 seconds to 6 hours, such as 30 seconds to 2 hours.

In accordance with a second aspect of the present invention, there is provided an oxidized lignin prepared by a method according to the present invention.

In accordance with a third aspect of the present invention, there is provided a use of the oxidized lignins prepared by the method according to the present invention in a binder composition, such as an aqueous binder composition for mineral fibres.

In accordance with a fourth aspect of the present invention, there is provided a system for performing the method according to the present invention.

DESCRIPTION OF THE PREFERRED EMBODIMENT

The method according to the present invention is a method for producing oxidized lignins comprising bringing into contact a component (i) comprising one or more lignins, a component (ii) comprising ammonia and/or one or more amine components, and/or any salt thereof and/or an alkali and/or earth alkali metal hydroxide, such as sodium hydroxide and/or potassium hydroxide, a component (iii) comprising one or more oxidation agents, and optionally a component (iv) in form of one or more plasticizers, and allowing a mixing/oxidation step, wherein an oxidised mixture is produced, followed by an oxidation step, wherein the oxidised mixture is allowed to continue to react for a dwell time of dwell time of 1 second to 10 hours, such as 10 seconds to 6 hours, such as 30 seconds to 2 hours.

In one embodiment of the invention, the process comprises a premixing step in which components are brought into contact with each other.

In the premixing step the following components can be brought into contact with each other:

component (i) and component (ii), or component (i) and component (ii) and component (iii), or component (i) and component (ii) and component (iv), or component (i) and component (ii) and component (iii) and component (iv).

In an embodiment of the invention, it is possible that the premixing step is carried out as a separate step and the mixing/oxidation step is carried out subsequently to the premixing step. In such an embodiment of the invention it is particularly advantageous to bring component (i) and component (ii) and optionally component (iv) into contact with each other in a premixing step. In a subsequent mixing/oxidation step, component (iii) is then added to the premixture produced in the premixing step.

In another example of the invention, it is possible that the premixing step corresponds to the mixing/oxidation step. In this embodiment of the invention, the components, for example component (i), component (ii) and component (iii) are mixed and an oxidation process is started at the same time. It is possible that the subsequent dwell time is performed in the same device as that used to perform the mixing/oxidation step. Such an implementation of the invention is particularly advantageous if component (iii) is air.

Component (i)

Component (i) comprises one or more lignins.

In one embodiment of the method according to the present invention, component (i) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (i) comprises one or more kraft lignins.

Component (ii)

In one embodiment according to the present invention, component (ii) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (ii) comprises ammonia and/or any salt thereof.

Without wanting to be bound by any particular theory, the present inventors believe that the improved stability properties of the derivatized lignins prepared according to the present invention with component (ii) being ammonia and/or any salt thereof are at least partly due to the fact that ammonia is a volatile compound and therefore evaporates from the final product or can be easily removed and reused.

Nevertheless, it can be advantageous in this embodiment of the method according to the present invention that component (ii), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (ii) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (iii)

In the method according to the present invention, component (iii) comprises one or more oxidation agents.

In one embodiment, component (iii) comprises one or more oxidation agents in form of hydrogen peroxide, organic or inorganic peroxides, molecular oxygen, air, ozone, halogen containing oxidation agents, or any mixture thereof.

The use of air as component (iii) is especially well suited. In particular, when using a rotor-stator device to perform a mixing/oxidation step, high shear and high air mixing can be achieved when using air as component (iii).

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (iii) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

$$H_2O_2 + OH^- \rightleftharpoons HOO^- + H_2O$$

$$H_2O_2 + OOH^- \rightleftharpoons \cdot OH + H_2O + \cdot O_2^-$$

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method according to the present invention.

Another advantage of the oxidation process is that the oxidized lignin is more hydrophilic. Higher hydrophilicity can enhance solubility in water and facilitate the adhesion to polar substrates such as mineral fibres.

Component (iv)

Component (iv) comprises one or more plasticizers.

In one embodiment, component (iv) is in form of one or more plasticizers selected from the group consisting of polyols, such as carbohydrates, hydrogenated sugars, such as sorbitol, erythriol, glycerol, monoethylene glycol, poly-ethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, pro-pylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iv) is in form of one or more plasticizers selected from the group consisting of carbonates, such as ethylene carbonate, propylene carbon-ate, lactones, lactams, lactides, compounds with a structure similar to lignin like vanillin, acetosyringone, solvents used as coalescing agents like alcohol ethers, polyvinyl alcohol.

In one embodiment, component (iv) is in form of one or more non-reactive plasticizer selected from the group con-sisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iv) is one or more reactive plasticizers selected from the group consisting of carbonates, such as ethylene carbonate, propylene carbon-ate, lactones, lactams, lactides, di- or tricarboxylic acids, such as adipic acid, or lactic acid, and/or vanillic acid and/or ferullic acid, polyurethane dispersions, acrylic based poly-mers with free carboxy groups, compounds with a structure similar to lignin like vanillin, acetosyringone.

In one embodiment, component (iv) is in form of one or more plasticizers selected from the group consisting of fatty alcohols, monohydroxy alcohols such as pentanol, stearyl alcohol.

In one embodiment, component (iv) comprises one or more plasticizers selected from the group consisting of polyethylene glycols, polyethylene glycol ethers.

Another particular surprising aspect of the present inven-tion is that the use of plasticizers having a boiling point of more than 100° C., in particular 140 to 250° C., strongly improves the mechanical properties of the mineral fibre products according to the present invention although, in view of their boiling point, it is likely that these plasticizers will at least in part evaporate during the curing of the aqueous binders in contact with the mineral fibres.

In one embodiment, component (iv) comprises one or more plasticizers having a boiling point of more than 100° C., such as 110 to 280° C., more preferred 120 to 260° C., more preferred 140 to 250° C.

In one embodiment, component (iv) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iv) comprises one or more polyethylene glycols having an average molecular weight of 4000 to 25000 g/mol, in particular 4000 to 15000 g/mol, more particular 8000 to 12000 g/mol.

In one embodiment, component (iv) is selected from the group consisting of fatty alcohols, monohydroxy alcohols, such as pentanol, stearyl alcohol.

In one embodiment, component (iv) is selected from one or more plasticizers selected from the group consisting of alkoxylates such as ethoxylates such as butanol ethoxylates, such as butoxytriglycol.

In one embodiment, component (iv) is selected from one or more propylene glycols.

In one embodiment, component (iv) is selected from one or more glycol esters.

In one embodiment, component (iv) is selected from one or more plasticizers selected from the group consisting of adipates, acetates, benzoates, cyclobenzoates, citrates, stear-ates, sorbates, sebacates, azelates, butyrates, valerates.

In one embodiment, component (iv) is selected from one or more plasticizers selected from the group consisting of phenol derivatives such as alkyl or aryl substituted phenols.

In one embodiment, component (iv) is selected from one or more plasticizers selected from the group consisting of silanols, siloxanes.

In one embodiment, component (iv) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iv) is selected from one or more hydroxy acids.

In one embodiment, component (iv) is selected from one or more plasticizers selected from the group consisting of monomeric amides such as acetamides, benzamide, fatty acid amides such as tall oil amides.

In one embodiment, component (iv) is selected from one or more plasticizers selected from the group consisting of quaternary ammonium compounds such as trimethylglycine, distearyldimethylammoniumchloride.

In one embodiment, component (iv) is selected from one or more plasticizers selected from the group consisting of vegetable oils such as castor oil, palm oil, linseed oil, tall oil, soybean oil.

In one embodiment, component (iv) is in form of tall oil.

In one embodiment, component (iv) is selected from one or more plasticizers selected from the group consisting of hydrogenated oils, acetylated oils.

In one embodiment, component (iv) is selected from one or more fatty acid methyl esters.

In one embodiment, component (iv) is selected from one or more plasticizers selected from the group consisting of alkyl polyglucosides, gluconamides, aminoglucoseamides, sucrose esters, sorbitan esters.

The term plasticizer refers to a substance that is added to a material in order to make the material softer, more flexible (by decreasing the glass-transition temperature Tg) and easier to process.

In one embodiment according to the present invention, component (iv) comprises one or more plasticizers in form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

The present inventors have found that the inclusion of component (iv) in form of one or more plasticizers provides a decrease of the viscosity of the reaction mixture which allows a very efficient method to produce oxidized lignins.

In one embodiment according to the present invention, component (iv) comprises one or more plasticizers in form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present invention, component (iv) comprises one or more plasticizers selected from the group of polyethylene glycols, polyvinyl alcohol, urea or any mixtures thereof.

Component (iv) can also be any mixture of the above mentioned compounds.

In one embodiment, component (iv) is present in an amount of 0.5 to 50, preferably 2.5 to 25, more preferably 3 to 15 wt.-%, based on the dry weight of component (i).

Further Components

In one embodiment, the method according to the present invention comprises further components, in particular a component (v) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method according to the present invention.

Mass Ratios of the Components

The person skilled in the art will use the components (i), (ii), (iii), and (iv) in relative amounts that the desired degree of oxidation of the lignins is achieved.

In one embodiment, the method according to the present invention is carried out such that the method comprises
  a component (i) comprises one or more lignins
  a component (ii) comprises ammonia
  a component (iii) comprises one more oxidation agents in form of hydrogen peroxide,
  a component (iv) comprises one or more plasticizers selected from the group of polyethylene glycol,
wherein the mass ratios of lignin, ammonia, hydrogen peroxide and polyethylene glycol are such that the amount of ammonia is 0.01 to 0.5 weight parts, such as 0.1 to 0.3, such as 0.15 to 0.25 weight parts ammonia (25 weight % solution in water), based on the dry weight of lignin, and wherein the amount of hydrogen peroxide (30 weight % solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present invention, the "dry weight of lignin" is preferably defined as the weight of the lignin in the supplied form.

Process

There is more than one possibility to bring the components (i), (ii), (iii), and (iv) in contact to achieve the desired oxidation reaction.

In one embodiment, the method comprises the steps of:
  a step of providing component (i) in form of an aqueous solution and/or dispersion of one more lignins, the lignin content of the aqueous solution being 5 to 90 weight-%, such as 10 to 85 weight-%, such as 15 to 70 weight-%, based on the total weight of the aqueous solution;
  a pH adjusting step by adding component (ii);
  a step of adding component (iv);
  a mixing/oxidation step by adding component (iii) comprising an oxidation agent.

After the mixing-oxidation step an oxidized mixture is present, especially an oxidized lignin, especially preferably an ammonia-oxidized lignin (AOL). This mixing/oxidation step is then followed by an oxidation step, wherein the oxidised mixture is allowed to continue to react for a dwell time of 1 second to 10 hours, such as 10 seconds to 6 hours, such as 30 seconds to 2 hours.

In one embodiment, the components (i), (ii), and optionally (iv) are premixed, this premixture then being mixed with component (iii) in a mixing/oxidation step. This then results in the oxidized lignin. The oxidized lignin then continues to react in an oxidation step for a dwell time of 1 second to 10 hours, such as 10 seconds to 6 hours, such as 30 seconds to 2 hours, preferably without carrying out a further mixing process.

Accordingly, during the mixing/oxidation step the reaction takes place during mixing, while during the oxidation step the mixture resulting from the mixing/oxidation step is allowed to continue to react, preferably without mixing.

It is possible that a slight mixing of the components takes place in the oxidation step. However, this mixing is not comparable to mixing during the mixing/oxidation step.

In one embodiment, the pH adjusting step is carried so that the resulting aqueous solution and/or dispersion is having a pH≥9, such as ≥10, such as ≥10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the mixing/oxidation step, the temperature is allowed to raise from 20° C. to 80° C., such as 35° C. to 70° C. and is then controlled in the range of 40° C. to 65° C., such as 40° C. to 60° C.

In one embodiment the mixing/oxidation step is carried out for a time of 0.01 seconds to 10 seconds, such as 0.05 seconds to 5 seconds, such as 0.1 seconds to 2 seconds.

The present inventors have found that the process according to the present invention allows to produce a high dry matter content of the reaction mixture and therefore a high throughput is possible in the process according to the present invention which allows the reaction product in form of the oxidized lignins to be used as a component in industrial mass production products such as mineral fibre products.

A premixing of the components, in particular component (i) with component (ii) and optionally with component (iv), preferably takes place before the mixing/oxidation step. This premixing step is carried out for a time of 60 seconds to 7.200 seconds, such as 600 seconds to 5.400 seconds, such as 1.800 seconds to 3.600 seconds.

In one embodiment, the method according to the present invention is carried out such that the dry matter content of the reaction mixture is 20 to 80 wt. %, such as 20 to 70 wt. %, preferably such as 20 to 40 wt. %.

In one embodiment, the method according to the present invention is carried out such that the viscosity of the oxidized lignin has a value of 100 cP to 100.000 cP, such as a value of 500 cP to 50.000 cP, such as a value of 1.000 cP to 25.000 cP.

For the purpose of the present invention, viscosity is dynamic viscosity and is defined as the resistance of the liquid/paste to a change in shape, or movement of neighbouring portions relative to one another. The viscosity is measured in centipoise (cP), which is the equivalent of 1 mPa s (milipascal second). Viscosity is measured at 20° C. using a viscometer. For the purpose of the present invention, the dynamic viscosity can be measured at 20° C. by a Cone Plate Wells Brookfield Viscometer.

The present inventors have found out that by allowing a mixing/oxidation step followed by an oxidation step, in which the reaction mixture is preferably not continued to be mixed, the oxidation rate can be controlled in a very efficient manner. At the same time, the costs for performing the method according to the present invention are reduced because the oxidation step subsequent to the mixing/oxidation step requires less complex equipment.

Another advantage is that oxidized lignin, which is produced according to the invention, is particularly stable. Another surprising advantage is that the oxidized lignin produced according to the invention is very well adjustable in terms of viscosity. Another surprising advantage is that the concentration of the oxidized lignin can be very high.

In one embodiment, the dwell time is so chosen that the oxidation reaction is brought to the desired degree of completion, preferably to full completion.

In one embodiment, the method according to the present invention is carried out such that the method comprises the usage of a rotator-stator device.

In one embodiment, the method according to the present invention is carried out such that the method is performed as a continuous or semi-continuous process.

System for Performing the Method

The present invention is also directed to a system for performing the method described above.

In one embodiment, the system for performing the method comprises:
- at least one rotor-stator device,
- one or more inlets for water and components (i) and (ii),
- one or more outlets of the rotor-stator device,
- at least one reaction device, in particular at least one reaction tube, which is arranged downstream in the process flow direction to at least one or more of the outlets.

In one embodiment of the invention, the system comprises one or more inlets for component (iii) and/or component (iv).

In one embodiment, the system comprises a premixing device.

The premixing device can comprise one or more inlets for water and/or component (i) and/or component (ii) and/or component (iii) and/or component (iv).

In one embodiment of the invention, the premixing device comprises inlets for water and component (i) and component (ii).

It is possible that, in a premixing step, component (iii) is also mixed with the three mentioned ingredients (water, component (i) and component (ii)). It is then possible that the premixing device has a further inlet for component (iii). If component (iii) is air, it is possible that the premixing device is formed by an open mixing vessel, so that in this case component (iii) is already brought into contact with the other components (water, component (i) and component (ii)) through the opening of the vessel. Also in this embodiment of the invention, it is possible that the premixing device optionally comprises an inlet for component (iv).

In one embodiment, the system is constructed in such a way that the inlets for components (i), (ii) and (iv) are inlets of a premixing device, in particular of an open rotor-stator device, whereby the system furthermore comprises an additional rotor-stator device, said additional rotor-stator device having an inlet for component (iii) and said additional rotor-stator device having an outlet for an oxidized lignin.

It is possible that the premixing step and the mixing/oxidizing step are carried out simultaneously. In this case, the premixing device and the mixing/oxidizing device are a single device, e. g. a rotor-stator device.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution.

The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the center of the device.

In one embodiment, one rotator-stator device used in the method according to the present invention comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the center.

For more details of the rotator-stator device to be used in one embodiment of the method according to the present invention, reference is made to US 2003/0042344 A1, which is incorporated by reference.

In one embodiment, the system comprises at least one sensor for monitoring parameters of the oxidized lignin, in particular for monitoring the degree of oxidation and/or viscosity and/or residual content of oxidation agent, wherein the sensor is preferably arranged in at least one reaction device, in particular in at least one reaction tube.

It is also possible that the reaction device is a reaction vessel or at least has a reaction vessel. In an embodiment of the invention, it is possible that the reaction device comprises at least one reaction tube and at least one reaction vessel.

To achieve a desired dwell time of the oxidized lignin in the reaction device (in the reaction vessel and/or in the reaction tube), the at least one reaction tube preferably has a length of 1 meter to 100 meters, such as 2 meters to 50 meters, such as 2 meters to 10 meters.

In one embodiment, the system comprises a return tube arranged between at least one reaction device, in particular in at least one reaction tube and/or in at least one reaction vessel, and the (additional) rotor-stator device, whereby a return of the oxidized lignin takes place in particular on the basis of the parameter measured by a/the sensor.

If an already oxidized lignin is fed to the (additional) rotor-stator device again, the degree of oxidation and/or viscosity and/or residual content of oxidation agents can be modified again.

In one embodiment, at least one rotor-stator device of the system comprises a cooling device.

Due to the mechanical and/or chemical processes carried out in a rotor-stator device, the mixed product may be heated so that it is advantageous to cool the rotor-stator device.

In one embodiment, the method according to the present invention is carried out such that the method uses one rotator-stator device. In this embodiment, the mixing of the components and the reaction of the components is carried out in the same rotator-stator device.

In one embodiment, the method according to the present invention is carried out such that the method uses two or more rotator-stator devices, wherein at least one rotator-stator device is used for the premixing of the components and at least one (additional) rotator-stator device is used for reacting the components.

This process can be divided into two steps:

1. Preparation of the premixture, in particular of the Lignin mass (i)+ (ii)+ (iv)
2. Oxidization of the premixture, in particular of the lignin mass Typically, two different types of rotor-/stator machines can be used:

1. Open rotor-/stator machine suitable for blending in the lignin powder into water on a very high concentration (20 to 40 wt-%). Less intensive mixing but special auxiliaries (inlet funnel, screw etc.) to handle highly viscous materials. Lower circumferential speed (up to 20 m/s, preferably up to 15 m/s). The machine can be used as batch system or continuous.
2. Inline rotor-/stator machine that has much higher shear forces—circumferential speeds of up to 55 m/s)—and creates beneficial conditions for a very quick chemical reaction. The machine is to be used continuously.

Figure 3:
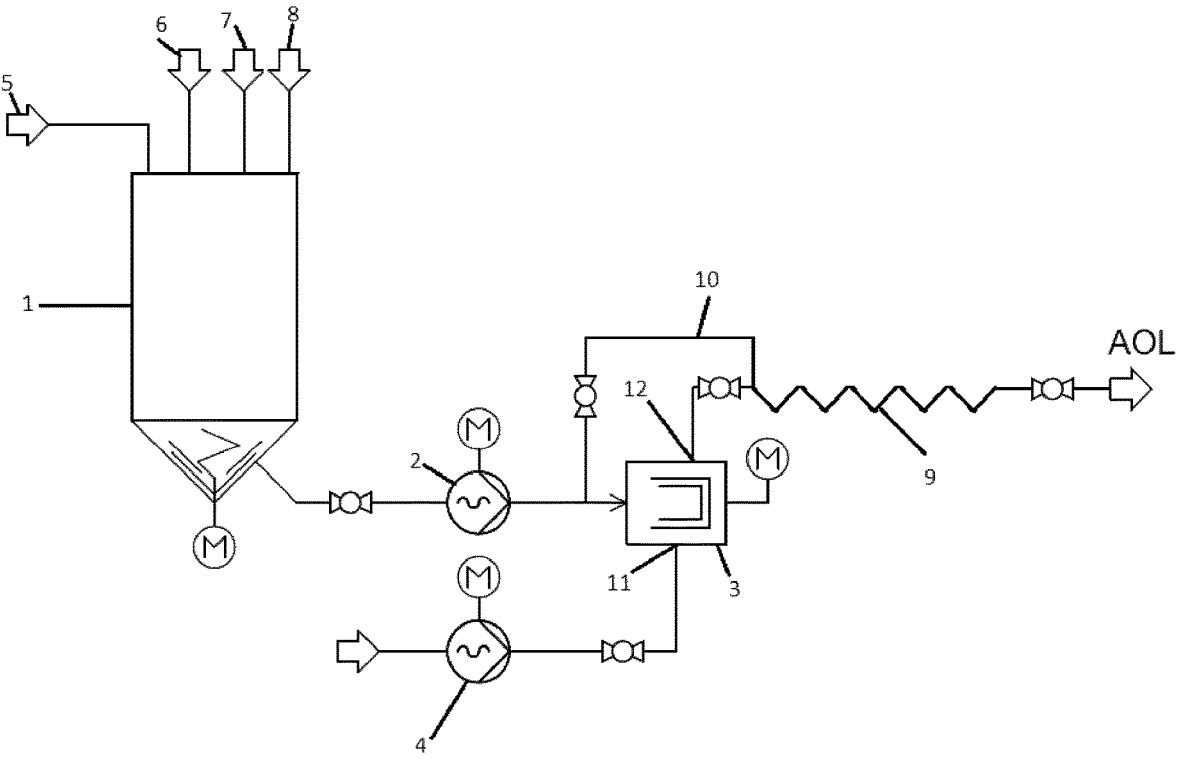

Such an embodiment is shown in FIG. 3 whereby (1) shows the premixing device used for mixing the components. The premixing device (1) can be a first open rotator-stator device.

(2) and (4) show pumps and (3) shows an additional rotator-stator device used for reacting the components.

The premixing device (1) comprises four inlets: one inlet for water (5), one inlet (6) for component (i), one inlet (7) for component (ii) and one inlet (8) for component (iv).

In the premixing device, in particular in an open rotor-stator device (1), the highly concentrated (20 to 40 wt-%) mass of Lignin/water is prepared. The lignin powder is added slowly to the warm water (30° C. to 60° C.) in which the correct amount of watery ammonia and/or alkali base have been added. This can be done in batch mode, or the materials are added intermittently/continuously creating a continuous flow of mass to the next step. Furthermore, one or more plasticizers (component (iv)) is added to the other components in the premixing device (1).

The premixture is transported by the pump (2) to the additional rotor-stator device (3). The rotor-stator device (3) again has an inlet (11). Component (iii) is fed through this inlet (11) into the rotor-stator device (3). A pump (4) is constructed for this purpose, which pumps component (iii) into the rotor-stator device (3).

After a mixing/oxidation step in the rotor-stator device (3) an oxidized mixture is present, especially an oxidized lignin, especially preferably an ammonia-oxidized lignin (AOL).

The oxidized lignin is transported via the outlet (12) into a reaction vessel, which in the present example is constructed as a reaction tube (9). The reaction tube (9) is arranged downstream in the process flow direction to the outlet (12) of the rotor-stator device (3) for oxidized lignin.

There—in the reaction tube (9)—the oxidized lignin remains for a dwell time of 1 second to 10 hours, such as 10 seconds to 6 hours, such as 30 seconds to 2 hours. During this dwell time the oxidized lignin continues to react. Afterwards a very stable oxidized lignin is obtained.

Furthermore, the system (20) comprises a return tube (10) arranged between the reaction tube (9) and the rotor-stator device (3). The return of the oxidized lignin takes place in particular on the basis of the parameter measured by a sensor.

The sensor is constructed for monitoring parameters of the oxidized lignin, in particular for monitoring the degree of oxidation and/or viscosity and/or residual content of oxidation agent, wherein the sensor is preferably arranged in the reaction vessel, in particular in the reaction tube (9), or downstream of the reaction vessel, in particular of the reaction tube (9).

In the example shown, the components are selected as follows:

component (i)=lignin
component (ii)=NH4OH
component (iii)=H2O2

The end product is therefore an oxidized lignin, in particular an ammonia-oxidized lignin (AOL).

Figure 4:
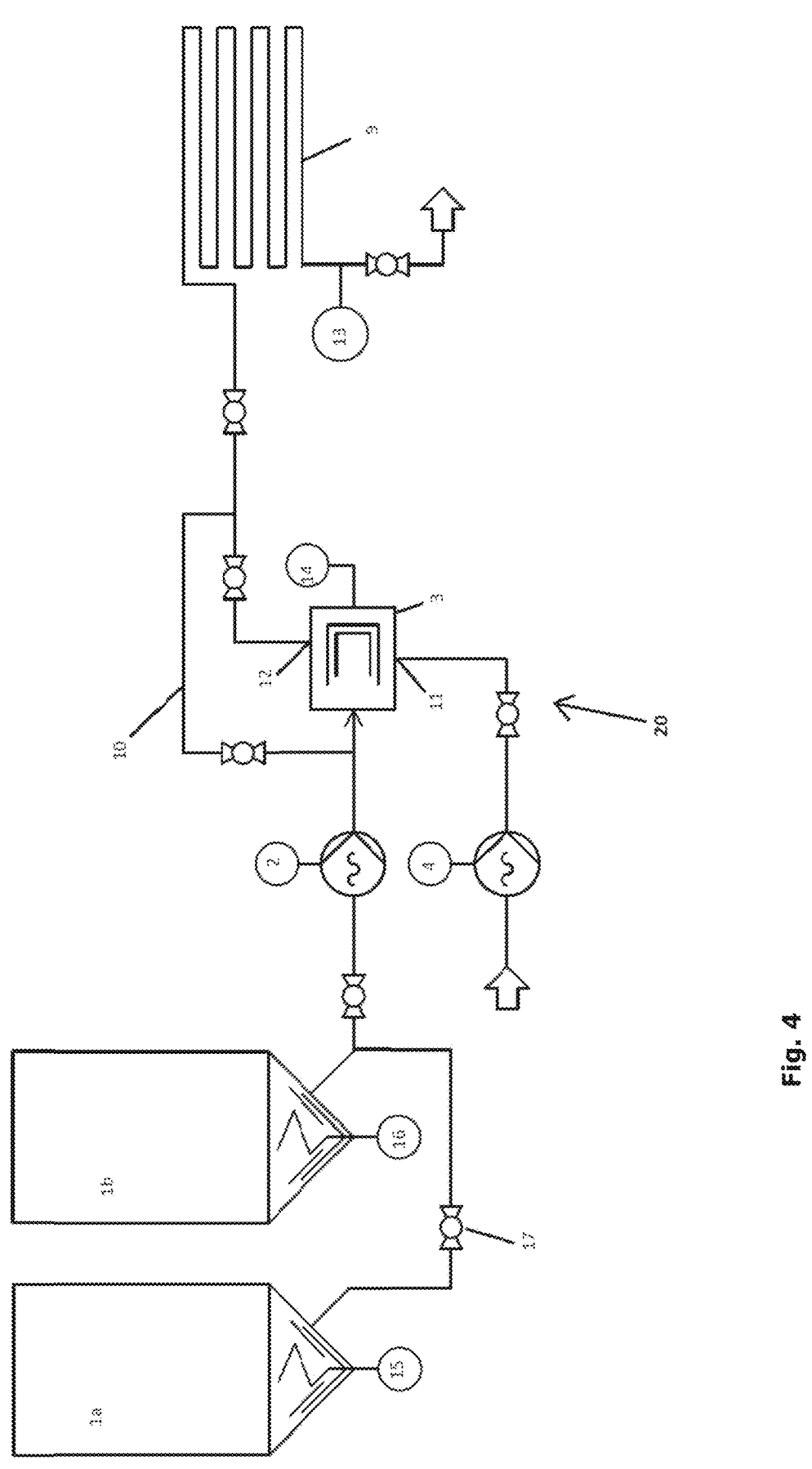

FIG. 4 shows a further embodiment of the system (20) in accordance with the invention.

This embodiment shows two premixing devices (1*a*, 1*b*) each having the same inlets as the premixing device (1) shown in FIG. 3. In FIG. 4 these inlets (5, 6, 7, 8) are not shown separately.

In both premixing devices (1*a*, 1*b*) the same premixtures are produced. Therefore, a premixture can always be produced in one premixing device (1*a*, 1*b*) separately from the other premixing device (1*a*, 1*b*).

A valve 17 can then be used to control which premixture of the premixing devices (1*a*, 1*b*) is fed to the rotor-stator device (3). Both premixing devices (1*a*, 1*b*) can be controlled by switching the motors (15, 16) on and off.

In the example shown, a sensor (13) is provided. This sensor (13) is located downstream of the reaction tube (9). The sensor (13) can, for example, measure parameters such as the degree of oxidation and/or viscosity and/or residual content of oxidation agent.

Figure 5:
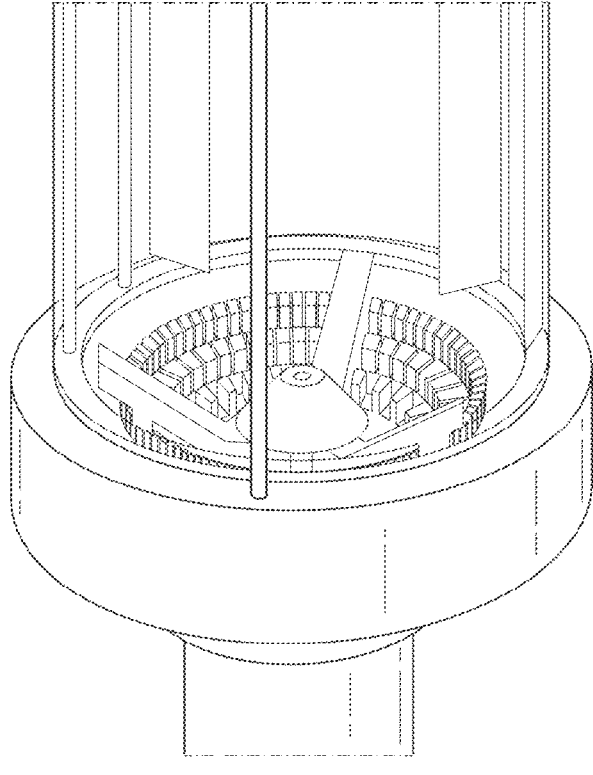

FIG. 5 shows an example of an open rotor-stator device without guiding funnel and central transport screw, which is mounted in the center of the rotor.

The created mass should be kept at a temperature of about 60° C. to keep the viscosity as low as possible and hence the material pumpable. The hot mass of lignin/water at a pH of 9 to 12 is then transferred using a suitable pump (2), e.g. progressive cavity pump or another volumetric pump, to the oxidation step.

Figure 6:
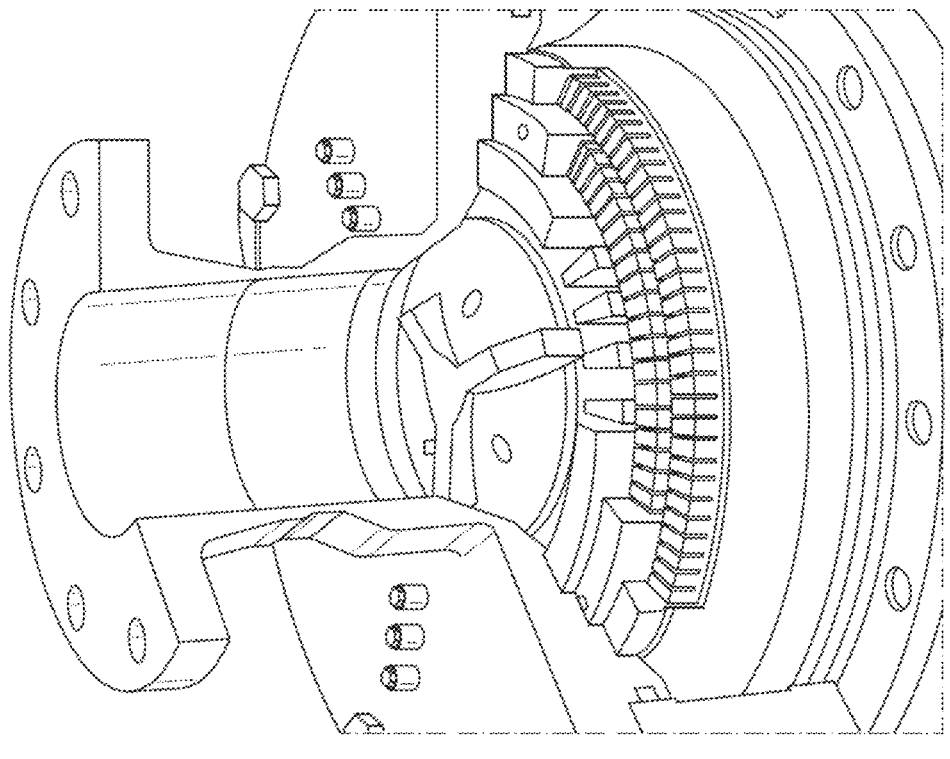

FIG. 6 shows an example of an inline rotor-stator device; the material enters axially and leaves the reactor radially.

The oxidation is done in a closed rotor-stator device (3) in a continuous inline reaction. A watery solution of Ammonia and/or alkali base is dosed with a dosing pump (4) into the rotor-stator device at the point of highest turbulence/shear. This ensures a rapid oxidation reaction. The oxidized material (AOL) is collected in suitable tanks.

Reaction Product

The present invention is also directed to oxidized lignins prepared by the method according to the present invention.

The present inventors have surprisingly found, that the oxidized lignins prepared according to the method of the present invention have very desirable reactivity properties and at the same time display improved fire resistance properties when used in products where they are comprised in a binder composition, and improved long term stability over previously known oxidized lignins.

The oxidized lignin also displays improved hydrophilicity.

An important parameter for the reactivity of the oxidized lignins prepared by the method according to the present invention is the carboxylic acid group content of the oxidized lignins.

In one embodiment, the oxidized lignin prepared according to the present invention has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (i).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared according to the present invention has an average carboxylic acid group content of more than 1.5 groups per macromolecule of component (i), such as more than 2 groups, such as more than 2.5 groups.

In one embodiment, oxidized lignin according to the present invention comprises ammonia-oxidized lignin (AOL).

Use of the Oxidized Lignins

In view of the properties described above, the oxidized lignins prepared by the method according to the present invention can be used for many purposes.

One such use is the use as a component in a binder composition for different purposes, like foundry sand, glass fibre tissue, composites, moulded articles, coatings, such as metal adhesives.

A particularly preferred use is the use as a component in an aqueous binder composition for mineral fibres, in particular for man-made vitreous fibres (MMVF).

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

| | |
|---|---|
| SiO2: | 30 to 51 |
| CaO: | 8 to 30 |
| MgO: | 2 to 25 |
| FeO (including Fe2O3): | 2 to 15 |
| Na2O + K2O: | not more than 10 |
| CaO + MgO: | 10 to 30 |

In preferred embodiments the MMVF have the following levels of elements, calculated as oxides in wt %:

| | |
|---|---|
| SiO2: | at least 30, 32, 35 or 37; not more than 51, 48, 45 or 43 |
| Al2O3: | at least 12, 16 or 17; not more than 30, 27 or 25 |
| CaO: | at least 8 or 10; not more than 30, 25 or 20 |
| MgO: | at least 2 or 5; not more than 25, 20 or 15 |
| FeO (including Fe2O3): | at least 4 or 5; not more than 15, 12 or 10 |
| FeO + MgO: | at least 10, 12 or 15; not more than 30, 25 or 20 |
| Na2O + K2O: | zero or at least 1; not more than 10 |
| CaO + MgO: | at least 10 or 15; not more than 30 or 25 |
| TiO2: | zero or at least 1; not more than 6, 4 or 2 |
| TiO2 + FeO: | at least 4 or 6; not more than 18 or 12 |
| B2O3: | zero or at least 1; not more than 5 or 3 |
| P2O5: | zero or at least 1; not more than 8 or 5 |
| Others: | zero or at least 1; not more than 8 or 5 |

The MMVF made by the method of the invention preferably have the composition in wt %:

| | |
|---|---|
| SiO2: | 35 to 50 |
| Al2O3: | 12 to 30 |
| TiO2: | up to 2 |
| Fe2O3: | 3 to 12 |
| CaO: | 5 to 30 |
| MgO: | up to 15 |
| Na2O: | 0 to 15 |
| K2O: | 0 to 15 |
| P2O5: | up to 3 |
| MnO: | up to 3 |
| B2O3: | up to 3 |

Another preferred composition for the MMVF is as follows in wt %:

| | |
|---|---|
| SiO2: | 39-55%, preferably 39-52% |
| Al2O3: | 16-27%, preferably 16-26% |
| CaO: | 6-20%, preferably 8-18% |
| MgO: | 1-5%, preferably 1-4.9% |
| Na2O: | 0-15%, preferably 2-12% |
| K2O: | 0-15%, preferably 2-12% |
| R2O (Na2O + K2O): | 10-14.7%, preferably 10-13.5% |
| P2O5: | 0-3%, preferably 0-2% |
| Fe2O3 (iron total): | 3-15%, preferably 3.2-8% |
| B2O3: | 0-2%, preferably 0-1% |
| TiO2: | 0-2%, preferably 0.4-1% |
| Others: | 0-2.0% |

Glass fibres commonly comprise the following oxides, in percent by weight:

| SiO2: | 50 to 70 |
|---|---|
| Al2O3: | 10 to 30 |
| CaO: | not more than 27 |
| MgO: | not more than 12 |

Glass fibres can also contain the following oxides, in percent by weight:

| Na2O + K2O: | 8 to 18, in particular Na2O + K2O greater than CaO + MgO |
|---|---|
| B2O3: | 3 to 12 |

Some glass fibre compositions can contain Al2O3: less than 2%

Methods of Production

MMV fibres can be made from a mineral melt. A mineral melt is provided in a conventional manner by providing mineral materials and melting them in a furnace. This furnace can be any of the types of furnace known for production of mineral melts for MMVF, for instance a shaft furnace such as a cupola furnace, a tank furnace, or a cyclone furnace.

Any suitable method may be employed to form MMVF from the mineral melt by fiberization. The fiberization can be by a spinning cup process in which melt is centrifugally extruded through orifices in the walls of a rotating cup (spinning cup, also known as internal centrifugation). Alternatively, the fiberization can be by centrifugal fiberization by projecting the melt onto and spinning off the outer surface of one fiberizing rotor, or off a cascade of a plurality of fiberizing rotors, which rotate about a substantially horizontal axis (cascade spinner).

The melt is thus formed into a cloud of fibres entrained in air and the fibres are collected as a web on a conveyor and carried away from the fiberizing apparatus. The web of fibres is then consolidated, which can involve cross-lapping and/or longitudinal compression and/or vertical compression and/or winding around a mandrel to produce a cylindrical product for pipe insulation. Other consolidation processes may also be performed.

The binder composition is applied to the fibres preferably when they are a cloud entrained in air. Alternatively, it can be applied after collection on the conveyor but this is less preferred.

After consolidation the consolidated web of fibres is passed into a curing device to cure the binder.

In one embodiment, the curing is carried out at temperatures from 100 to 300° C., such as 170 to 270° C., such as 180 to 250° C., such as 190 to 230° C.

In a preferred embodiment, the curing takes place in a conventional curing oven for mineral wool production, preferably operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state. The cured binder composition binds the fibres to form a structurally coherent matrix of fibres.

In a one embodiment, the curing of the binder in contact with the mineral fibres takes place in a heat press.

The curing of a binder in contact with the mineral fibres in a heat press has the particular advantage that it enables the production of high-density products.

In one embodiment the curing process comprises drying by pressure. The pressure may be applied by blowing air or gas through/over the mixture of mineral fibres and binder.

Another use is the use of the oxidized lignin as a component in an aqueous adhesive composition for lignocellulosic materials, such as wood.

Examples of lignocellulosic materials include but are not limited to solid wood, wood fibers, sawdust, paper, straw.

The following examples are intended to further illustrate the invention without limiting its scope.

EXAMPLES

In the following examples, several oxidized lignins which fall under the definition of the present invention were prepared.

The following properties were determined for the oxidized lignins according to the present invention:

Component Solids Content:

The content of each of the components in a given oxidized lignin solution is based on the anhydrous mass of the components or as stated below.

Kraft lignin was supplier by UPM as BioPiva100™ as dry powder at 67% dry solid matter. NH$_4$OH 24.7% was supplied by Univar and used in supplied form. H$_2$O$_2$, 35% (Cas no 7722-84-1) was supplied by Univar and used in supplied form or by dilution with water. PEG 200 was supplied by Univar and were assumed anhydrous for simplicity and used as such. KOH was supplied by Sigma Aldrich and used in the supplied form; assumed to be anhydrous for simplicity.

Oxidized Lignin Solids

The content of the oxidized lignin after heating to 200° C. for 1 h is termed "Dry solid matter" and stated as a percentage of remaining weight after the heating. Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for a blank sample. $C_{acid}$ is 0.1M HCl in this case and $m_{s,g}$ is the weight of the sample.

Oxidized Lignin Compositions According to the Present Invention

In the following, the entry numbers of the oxidized lignin example correspond to the entry numbers used in Table 1 and 2.

Example 1

8.5 l hot water (50° C.) and 1.9 l NH₄OH (24.7%) was mixed, where after 9.0 kg lignin (UPM biopiva 100) was added slowly over 10 minutes at high agitation (660 rpm, 44 Hz).

The temperature increased by high shear forces. After 30 minutes, 4 l of hot water was added, and the material was stirred for another 15 minutes before adding the remaining portion of hot water (5 l). Samples were taken out for analyses of un-dissolved lignin by use of a Hegman Scale and pH measurements.

This premix was then transferred to a rotor-stator device and a reaction device where the oxidation was made by use of H2O2 (17.5 vol %). The reaction device used in this case has at least partially a reaction tube and a reaction vessel. Dosage of the premixture was 150 l/h and the H2O2 was dosed at 18 l/h.

In the present case, a Cavitron CD1000 rotor-stator device was used to carry out the mixing/oxidation step. The rotor-stator device was run at 250 Hz (55 m/s circumferential speed) with a counter pressure at 2 bar. The dwell time in the reaction tube was 3.2 minutes and in the reaction vessel 2 hours.

Temperature of the premixture was 62° C., and the oxidation step increased the temperature to 70° C.

The final product was analysed for the COOH group content, dry solid matter, pH, viscosity and remaining H2O2.

Example 2

8.5 l hot water (50° C.), 1.1 l NH₄OH (24.7%) and 50 g KOH (solid) was mixed, where after 9.0 kg lignin (UPM biopiva 100) was added slowly over 10 minutes at high agitation (660 rpm, 44 Hz).

The temperature increased by high shear forces. After 30 minutes, 4 l hot water was added, and the material was stirred for another 15 minutes before adding the remaining portion of hot water (5 l) with a slight cooling. Samples were taken out for analyses of un-dissolved lignin by use of a Hegman Scale and pH measurements.

This premixture was then transferred to a rotor-stator device and a reaction device, where the oxidation was made by use of H2O2 (17.5 vol %). The reaction device used in this case has at least partially a reaction tube and a reaction vessel. Dosage of the premixture was 150 l/h and the H2O2 was dosed at 18 l/h. In the present case, a Cavitron CD1000 rotor-stator device was used to carry out the mixing/oxidation step. The rotor-stator device was run at 250 Hz (55 m/s circumferential speed) with a counter pressure at 2 bar. The dwell time in the reaction tube was 3.2 minutes and in the reaction vessel 2 hours.

Temperature of the premixture was 62° C., and the oxidation step increased the temperature to 65° C.

The final product was analysed for the COOH group content, dry solid matter, pH, viscosity and remaining H2O2.

Example 3

450 l hot water (70° C.) and 39.1 l NH₄OH (24.7%) was mixed, whereafter 100.0 kg lignin (UPM biopiva 100) was added slowly over 15 minutes at high agitation (500-1000 rpm, with a mixing element diameter of 350 mm). In this case a container agitator with a folding propeller was used. Samples were taken out for analyses of un-dissolved lignin by use of a Hegman Scale and pH measurements.

This premixture was then transferred to a rotor-stator device and a reaction device, where the oxidation was made by use of H2O2 (17.5 vol %). Dosage of the premixture was 150 l/h and the H2O2 was dosed at 18 l/h. The Cavitron was run at 250 Hz (55 m/s circumferential speed) with a counter pressure at 2 bar. The dwell time in the reaction tube was 3.2 minutes and in the reaction vessel 5 hours.

Temperature of the premixture was 62° C., and the oxidation step increased the temperature to 65° C.

The final product was analysed for the COOH group content, dry solid matter, pH, viscosity and remaining H2O2.

From 50 kg of the above prepared AOL resin a binder was formulated by addition of 9 kg polyethylene glycol 200 and 14.43 kg of a 31% solution of Primid XL-552 in water.

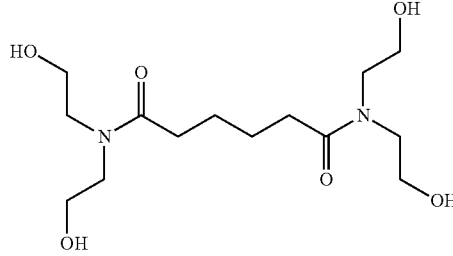

Primid XL-552

Analysis of the final binder showed the following data:

Solids content: 18.9% pH: 9.7
Viscosity: 25.5 mPas·s
Density: 1.066 kg/l

This binder was used to produce a high density stone wool product, 100 mm, 145 kg/m3 with ignition loss of 2.96%. Mechanical tests (delamination, compression) and moisture resistance and water absorption were made.

The binder content is taken as the LOI. The binder includes oil and other binder additives.

Example 4

15.1 l hot water (50° C.) and 2.6 l NH₄OH (24.7%) was mixed, where after 12.5 kg lignin (UPM biopiva 100) was added slowly over 10 minutes at high agitation (750 rpm, 50 Hz).

The temperature increased by high shear forces. After 30 minutes, the temperature was 78° C. and this was reduced slightly by use of cooling water. Samples were taken out for analyses of un-dissolved lignin by use of a Hegman Scale and pH measurements.

This premixture was then transferred to a rotor-stator device and a reaction device (combination of reaction tube and reaction vessel), where the oxidation was made by use of H2O2 (17.5 vol %). Dosage of the premixtures was 150 l/h and the H2O2 was dosed at 18 l/h. A Cavitron CD1000 rotor-stator device was run at 250 Hz (55 m/s circumferential speed) with a counter pressure at 2 bar.

The dwell time in the reaction tube was 3.1 minutes and in the reaction vessel 2 hours.

Temperature of the premixture was 75° C., and the oxidation step increased the temperature to 90° C. showing a strong exothermic reaction.

The final product was analysed for the COOH group content, dry solid matter, pH, viscosity and remaining H2O2.

Example 5

The premixture was made as described in example 1 and transferred to the rotor/stator device where the oxidation was made by use of H2O2 (17.5 vol %).

Dosage of the premixture was 150 l/h and the H2O2 was dosed at 18 l/h. A Cavitron CD1000 rotor-stator device was run at 250 Hz (55 m/s circumferential speed) with a counter pressure at 2 bar.

The oxidized mixture was recycled in the rotor/stator device for up to four cycles, where the first cycle was made with H2O2 and the remaining cycles were made without extra addition of oxidant. The dwell time in the reaction tube was 3.2 minutes, then 6.4 minutes, then 9.6 minutes and eventually 12.8 minutes.

Temperature of the premixture was 42° C., and the oxidation step increased the temperature to 42° C. in the first cycle (Example 5A), 53° C. in the second cycle (Example 5B), 59° C. in the third cycle (Example 5C) and 63° C. in the fourth cycle (Example 5D).

The final products (example 5A to 5D) were analysed for the COOH group content, dry solid matter, pH, viscosity and remaining H2O2.

Example 5A=Example, where the premixture is treated twice in the rotor-stator device (one return to the rotor-stator device).

Example 5B=Example, where the premixture is treated three times in the rotor-stator device (two returns to the rotor-stator device).

Example 5C=Example, where the premixture is treated four times in the rotor-stator device (three returns to the rotor-stator device).

Example 5D=Example, where the premixture is treated five times in the rotor-stator device (four returns to the rotor-stator device).

Example 6

9.5 l hot water (50° C.) and 1.9 l NH4OH (24.7%) was mixed, where after 9.0 kg lignin (UPM biopiva 100) was added slowly over 10 minutes at high agitation (660 rpm, 44 Hz).

The temperature increased by high shear forces. After 30 minutes, 5 l hot water was added, and the material was stirred for another 15 minutes before adding the remaining portion of hot water (5 l). Samples were taken out for analyses of un-dissolved lignin by use of a Hegman Scale and PH measurements.

This premixture was then transferred to a rotor-stator device and a reaction device (combination of reaction tube and reaction vessel), where the oxidation was made by use of H2O2 (17.5 vol %) at different amounts.

Dosage of the premixtures was 150 l/h and the H2O2 was dosed at 0 l/h,
5.9 l/h (example 6A),
9.3 l/h (example 6B),
11.7 l/h (example 6C),
17.6 l/h (example 6D), and
39 l/h (example 6E), A Cavitron CD1000 rotor-stator device was run at 250 Hz (55 m/s circumferential speed) with a counter pressure at 2 bar. The dwell time in the reaction tube was 3.2 minutes and in the reaction vessel 2 hours.

Temperature of the premixtures was 52° C., and the oxidation step increased the temperature to 60° C.

The final products (example 6A to 6E) was analysed for the COOH group content, dry solid matter, pH, viscosity and remaining H2O2.

Example 7

Premixture made as described in example 1 was transferred to the rotor-stator device where the oxidation was made by use of H2O2 (35.0 vol %).

Dosage of the premixture was 150 l/h and the H2O2 was dosed at 4.2 l/h (Example 7A) and 8.4 l/h (Example 7B). A Cavitron CD1000 rotor-stator device was run at 250 Hz (55 m/s circumferential speed) with a counter pressure at 2 bar.

The dwell time in the reaction tube was 3.2 minutes and in the reaction vessel 2 hours.

Temperature of the premixture was 75° C., and the oxidation step increased the temperature to 90° C. showing a strong exothermic reaction.

The final products (example 7A and 7B) was analysed for the COOH group content, dry solid matter, pH, viscosity and remaining H2O2.

Example 8

Premixture was made as described in example 1. The oxidation was made in the premixture with use of air.

The final product was analysed for the COOH group content, dry solid matter, pH and viscosity.

Example 9

Premixture was made as described in example 4. The oxidation was made in the premixture with use of air.

The final product was analysed for the COOH group content, dry solid matter, pH and viscosity.

Example 10

450 L hot water (70° C.) and 39.1 L NH4OH (24.7%) was mixed, where after 210.0 kg lignin (UPM biopiva 100) was added slowly over 30 minutes at high agitation. Samples were taken out for analyses of un-dissolved lignin by use of a Hegman Scale and pH measurements.

Oxidation was done by use of air in the premixing device.

The final product was analysed for the COOH group content, dry solid matter, pH, viscosity and remaining H2O2.

From 50 kg of the above prepared AOL resin a binder was formulated by addition of 9 kg polyethylene glycol 200 and 14.43 kg of a 31% solution of Primid XL-552 in water.

Analysis of the final binder showed the following data:
Solids content: 18.9% pH: 9.7
Viscosity: 25.5 mPas·s
Density: 1.066 kg/l Binder from this example was used to produce a high density stone wool product, 100 mm, 145 kg/m3 with ignition loss of 3.27%. Mechanical tests (delamination, compression) and moisture resistance and water absorption were made.

The binder content is taken as the LOI. The binder includes oil and other binder additives.

Comparative Example 1

This binder is a phenol-formaldehyde resin modified with urea, a PUF-resol.

A phenol-formaldehyde resin is prepared by reacting 37% aq. formaldehyde (606 kg) and phenol (189 kg) in the presence of 46% aq. potassium hydroxide (25.5 kg) at a reaction temperature of 84° C. preceded by a heating rate of approximately 1° C. per minute. The reaction is continued at 84° C. until the acid tolerance of the resin is 4 and most of the phenol is converted. Urea (241 kg) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 l ion exchanged water. 5 ml of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (ml) with the amount of sample (ml):

$$AT = (\text{Used titration volume (ml)})/(\text{Sample volume (ml)})$$

Using the urea-modified phenol-formaldehyde resin obtained, a binder is made by addition of 25% aq. ammonia (90 l) and ammonium sulfate (13.2 kg) followed by water (1300 kg).

The binder solids were then measured as described above and the mixture was diluted with the required amount of water and silane for mechanical measurements (15% binder solids solution, 0.5% silane of binder solids).

Comparative Example 2

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining H2O2.

Binder from this comparative example was used to produce a high density stone wool product, 100 mm, 145 kg/m3 with ignition loss of 2.86%. Mechanical tests (delamination, compression) and moisture resistance and water absorption were made.

The binder content is taken as the LOI. The binder includes oil and other binder additives.

TABLE 1

| Example | Dry solid matter, 200C, 1 h, % | COOH, mmol/g solids | pH | viscosity |
|---|---|---|---|---|
| 1 | 22.3 | 1.13 | 9.6 | medium |
| 2 | 20.2 | 0.93 | 10.4 | medium |
| 3 | 16.7 | 1.24 | 9.6 | low |
| 4 | 23.7 | 1.22 | 9.6 | high |
| 5A | 16.3 | 1.20 | 9.6 | low |
| 5B | 16.0 | 1.25 | 9.6 | low |
| 5C | 16.4 | 1.29 | 9.5 | low |
| 5D | 16.3 | 1.31 | 9.5 | low |
| 6A | 19.2 | 0.72 | 9.5 | low |
| 6B | 18.2 | 0.85 | 9.5 | low |
| 6C | 17.6 | 0.94 | 9.4 | low |
| 6D | 17.2 | 0.98 | 9.4 | low |
| 6E | 16.5 | 0.99 | 9.3 | low |
| 7A | 20.9 | 1.04 | 9.6 | medium |
| 7B | 20.1 | 0.94 | 9.6 | medium |
| 8 | 19.2 | 0.73 | 9.5 | low |
| 9 | 31.8 | 0.66 | 9.5 | high |

It was discovered that in none of the examples 1 to 9, residual H2O2 could be detected after the oxidation. This was proven by reaction with starch and iodine in the presence of sulfuric acid.

Test of Stone Wool Products:

The high density products have been examined for properties according to the product standard for Factory made mineral wool (MW) products, DS/EN13162:2012+A1: 2015, meaning relevant mechanical properties besides other basic characteristics for stone wool products.

The testing has been performed on slabs, where test specimens according to the dimensional specifications and to the number of test specimens required to get one test result, as stated in EN13162 for each of the different test methods, has been cut out. Each of the stated values for the mechanical properties obtained is an average of more results according to EN13162.

Compression Stress

Compression stress at 10% deformation, 010%, has been determined according to DS/EN 826:2013 Determination of compression behaviour. At least 3 test specimens in 300×300 mm in full product thickness (for one result) has been measured after grinding of the surface.

Delamination (Tensile Strength Perpendicular to Faces)

Tensile strength perpendicular to faces, σmt has been determined according to DS/EN 1607:2013. At least 3 test specimens in 300×300 mm in full product thickness for one result have been measured.

Tensile strength perpendicular to faces has further also been determined for test specimens after exposure to accelerated ageing for evaluation of the ageing persistence, where two different methods have been applied:

Ageing Tests (Climate Chamber & Autoclave):

Method 1 (Climate Chamber)

Test specimens exposed to heat-moisture action for 7, 14 and 28 days at (70±2) ° C. and (95±5) % relative humidity in climatic chamber (Nordtest method NT Build 434: 1995.05).

Method 2 (Autoclave)

Test specimens exposed to heat-moisture action for 15 minutes at (121±2) ° C. and (95±5) % relative humidity in pressure boiler.

For testing 5 similar test specimens in 300×300 mm in full product thickness are cut out of the same slab, and for one test specimen the tensile strength without pre-treatment is measured.

The other test specimens are exposed to accelerated ageing, according to method 1 in total 3 test specimens: one for 7 days, one for 14 days, one for 28 days of treatment, and according to method 2: one test specimen, after final pre-treatment the measurements have been performed and the ageing resistance determined.

Water Absorption

Short term water absorption has been determined according to DS EN 1609:2013, method A, using 4 individual test specimens in 200×200 mm in full product thickness to get one result.

Dimensional stability has been determined according to DS/EN 1604:2013, Determination of dimensional stability under specified conditions, however instead of the EN1604 prescribed conditions (48 hrs, 70° C., 90% RH), the conditions of (70±2) ° C. and (95±5) % R.H. in climatic chamber for 28 days has been used for evaluation of the thickness after conditioning, e.g. determination of change in thickness, Δεp.

Dimensions of products and test specimens has been performed according to the relevant test methods, DS/EN822:2013, Determination of length and width, and DS/EN823:2013, Determination of thickness.

Determination of binder content is performed according to DS/EN13820:2003 Determination of organic content, where the binder content is defined as the quantity of organic material burnt away at a given temperature, here using (590±20) ° C. for at least 10 min or more until constant mass. Determination of ignition loss consists of at least 10 g wool corresponding to 8-20 cut-outs (minimum 8 cut-outs) performed evenly distributed over the test specimen using a cork borer ensuring to comprise an entire product thickness.

The binder content is taken as the LOI. The binder includes oil and other binder additives.

TABLE 2

| | Unaged | Climate chamber at 70° C./95% | | Auto-clave |
|---|---|---|---|---|
| Delamination, aged in % of unaged | 0 kPa | 7 days % | 14 days % | 15 min % |
| Comparative Example 1 | 25 | 72 | 65 | 62 |
| Example 3 | 23 | 67 | 64 | 69 |
| Comparative Example 2 | 21 | 72 | 66 | 65 |
| Example 10 | 23 | 71 | 69 | 68 |

TABLE 2-continued

| | Unaged | Climate chamber at 70° C./95% | | Auto-clave |
|---|---|---|---|---|
| Delamination, actuel | 0 kPa | 7 kPa | 14 kPa | 15 min kPa |
| Comparative Example 1 | 25 | 18 | 17 | 16 |
| Example 3 | 23 | 15 | 15 | 16 |
| Comparative Example 2 | 21 | 15 | 14 | 14 |
| Example 10 | 23 | 17 | 16 | 16 |

| | Climate chamber at RI 70° C./95% | |
|---|---|---|
| Moisture resistance | 7 days % | 14 days % |
| Comparative Example 1 | 0.6 | 0.6 |
| Example 3 | 0.4 | 0.6 |
| Comparative Example 2 | 0.7 | 0.6 |
| Example 10 | 0.5 | 0.4 |

| | Oil % | 24 hours kg/m2 |
|---|---|---|
| Water absorption | | |
| Comparative Example 1 | 0.2 | 0.1 |
| Example 3 | 0.2 | 0.2 |
| Comparative Example 2 | 0.2 | 0.2 |
| Example 10 | 0.2 | 0.3 |

| | | Climate chamber at 70° C./95% | |
|---|---|---|---|
| Compression, sigma 10% | Unaged | 7 | 14 |
| Comparative Example 1 | 80 | 61 | 61 |
| Example 3 | 70 | 58 | 54 |
| Comparative Example 2 | 71 | 55 | 56 |
| Example 10 | 72 | 58 | 58 |

Bar Tests

Binders were made based on the AOLs of Examples 1, 2, 3, 8, and Comparative Example 2:

49.3 g AOL (19.0% solids), 0.8 g primid XL552 (100% solids) and 2.4 g PEG200 (100% solids) were mixed with 0.8 g water to yield 19% solids;

and then used for test of mechanical properties in bar tests.

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 200° C. The curing time was 1 h. After cooling to room temperature, the bars were carefully taken out of the containers. Five of the bars were aged in a water bath at 80° C. for 3 h.

After drying for 1-2 days, the aged bars as well as five unaged bars were broken in a 3 point bending test (test speed: 10.0 mm/min; rupture level: 50%; nominal strength: 30 N/mm²; support distance: 40 mm; max deflection 20 mm; nominal e-module 10000 N/mm²) on a Bent Tram machine to investigate their mechanical strengths. The bars were placed with the "top face" up (i.e. the face with the dimensions length=5.6 cm, width=2.5 cm) in the machine.

TABLE 3

| Bar strength | Example 1 | Example 2 | Example 3 | Example 8 | Comparative Example 2 |
|---|---|---|---|---|---|
| Avg. strength, unaged (kN) | 0.26 | 0.28 | 0.27 | 0.19 | 0.28 |
| St. error (kN) | 0.03 | 0.01 | 0.05 | 0.02 | 0.03 |
| Average strength, water bath aged (kN) | 0.14 | 0.14 | 0.14 | 0.15 | 0.18 |
| St. error (kN) | 0.01 | 0.01 | 0.02 | 0.02 | 0.01 |

REFERENCE SIGNS 1 premixing device
1a, 1b premixing device
2 motor
3 (additional) rotor-stator device
4 motor
5 inlet for water
6 inlet for component (i)
7 inlet for component (ii)
8 inlet for component (iv)
9 reaction tube
10 return tube
11 inlet for component (iii)
12 outlet
13 sensor
14 motor
15 motor
16 motor
17 valve
20 system

The invention claimed is:

1. A method for producing oxidized lignins, wherein the method comprises bringing into contact a component (i) comprising one or more lignins, a component (ii) comprising ammonia, a component (iii) comprising one or more oxidation agents comprising hydrogen peroxide, and a component (iv) comprising polyethylene glycol, mass ratios of lignin, ammonia, hydrogen peroxide and polyethylene glycol being such that an amount of ammonia is from 0.01 to 0.5 weight parts, an amount of hydrogen peroxide is from 0.025 to 1.0 weight parts, and an amount of polyethylene glycol is from 0.03 to 0.60 weight parts, all based on a dry weight of lignin;

and allowing a mixing/oxidation to take place, whereby an oxidized mixture is produced, followed by an oxidation step, the oxidized mixture being allowed to continue to react for a dwell time of from 1 second to 10 hours.

2. The method of claim 1, wherein component (i) and component (ii), or component (i) and component (ii) and component (iii), or component (i) and component (ii) and component (iv), or component (i) and component (ii) and component (iii) and component (iv), are brought into contact with each other in a premixing step.

3. The method of claim 1, wherein component (i) comprises one or more kraft lignins, one or more soda lignins, one or more lignosulfonate lignins, one or more organosolv lignins, one or more lignins from biorefining processes of lignocellulosic feedstocks, or any mixture thereof.

4. The method of claim 1, wherein the method comprises bringing into contact components (i), component (ii), component (iii) and a component (v) in the form of an oxidation catalyst which comprises one or more transition metals and/or selenium.

5. The method of claim 1, wherein the method comprises providing component (i) in the form of an aqueous solution and/or dispersion of one more lignins, a lignin content of the aqueous solution being from 5 to 90 weight-%, based on a total weight of the aqueous solution;

adjusting a pH by adding component (ii);

adding component (iv);

mixing/oxidation by adding component (iii).

6. The method of claim 1, wherein adjusting the pH is carried out so that a reaction mixture has a pH≥9.

7. The method of claim 1, wherein during mixing/oxidation a temperature is allowed to raise from 20° C. to 80° C. and is then controlled in a range of from 40° C. to 65° C.

8. The method of claim 1, wherein mixing/oxidation is carried out for a time of from 0.01 seconds to 10 seconds.

9. The method of claim 1, wherein the oxidized lignin has a viscosity of from 100 cP to 100,000 cP.

10. The method of claim 1, wherein the method is performed as a continuous process.

11. The method of claim 1, wherein the oxidized mixture is allowed to continue to react for a dwell time of from 10 seconds to 6 hours.

12. The method of claim 1, wherein the oxidized mixture is allowed to continue to react for a dwell time of from 30 seconds to 2 hours.

13. The method of claim 1, wherein an amount of ammonia is from 0.1 to 0.3 weight parts, an amount of hydrogen peroxide is from 0.07 to 0.5 weight parts, and an amount of polyethylene glycol is from 0.07 to 0.50 weight parts, all based on a dry weight of lignin.

14. The method of claim 1, wherein an amount of ammonia is from 0.15 to 0.25 weight parts, an amount of hydrogen peroxide is from 0.15 to 0.3 weight parts, and an amount of polyethylene glycol is from 0.10 to 0.40 weight parts, all based on a dry weight of lignin.

15. The method of claim 5, wherein component (i) is employed in the form of an aqueous solution and/or dispersion having a lignin content of from 10 to 85 weight-%.

16. The method of claim 5, wherein component (i) is employed in the form of an aqueous solution and/or dispersion having a lignin content of from 15 to 70 weight-%.

17. The method of claim 1, wherein adjusting the pH is carried out so that a reaction mixture has a pH≥10.

18. The method of claim 1, wherein during mixing/oxidation a temperature is allowed to raise from 35° C. to 70° C. and is then controlled in a range of from 40° C. to 60° C.

19. The method of claim 1, wherein the oxidized lignin has a viscosity of from 500 cP to 50,000 cP.

20. The method of claim 1, wherein the oxidized lignin has a viscosity of from 1,000 cP to 25,000 cP.

* * * * *